3,177,174
NON - STATIC POLYOLEFIN - POLYETHYLENE
GLYCOL STEARATE ESTER COMPOSITION
George A. Tirpak, Wayne, N.J., assignor to W. R. Grace &
Co., a corporation of Connecticut
No Drawing. Filed Dec. 7, 1961, Ser. No. 157,855
3 Claims. (Cl. 260—31.4)

The present invention relates to a novel and useful composition, a process employing such a composition and a shaped structure resulting from the process. More particularly, it relates to a high density polyethylene composition which may be fabricated by conventional means to form a shaped structure which, for all practical purposes, will not accept a static charge on its surface.

High density polyethylene homopolymers and copolymers (i.e. density above about 0.940), when formed into films, sheets, filaments or the like have a tendency to develop and retain electrostatic charges during processing operations. As a result of the charges produced on such articles dust, lint and the like are attracted to the surface and result in fabrication problems. This electrostatic characteristic is particularly troublesome in the fabrication of films, sheets or filaments as the static charges tend to cause the articles to cling together or to the processing equipment itself. Another disadvantage of high electrostatic charge is the danger involved when such materials are stacked or formed in the presence of highly volatile inflammable materials. It is obviously desirable, therefore, to reduce the tendency of such materials to accept a static charge.

It is known in the art that various additives may be blended with different types of synthetic polymers to vary the propensity of the material to maintain a static charge. Typical materials are disclosed in United States Patents 3,005,793, 2,723,256, 2,624,725, 2,584,337, 2,579,375, 2,577,635, 2,556,045, and 2,525,691. Such materials are referred to in the art as "antistatic" agents and, in general, such materials will reduce from 50 to 80%, or more, the ability of the treated polymer to maintain a static charge. However, most of these additives act only to "reduce" the susceptibility of the material to accept a static charge and few are known which will, for all practical purposes, eliminate the ability of the polymer to accept any static charge whatsoever without substantial alteration of the polymer properties.

In contrast to the additives of the prior art, the materials of the present invention, when incorporated into a high density polyethylene, will give a "non-static" composition which, for all practical purposes, is substantially immune to static charging with little, if any, change in the other physical properties of the polymer. Thus, it is an object of the present invention to provide a composition which may be processed into shaped structures substantially immune to static charging. A further object is to provide a process for the formation of a non-static high density polyethylene shaped structure. A still further object is to provide a non-static shaped structure of high density polyethylene. Other objects will become apparent as the description of the invention proceeds.

These objects are accomplished by the present invention which provides a substantially non-static composition comprising (A) a polymer having a density of at least about 0.940 and selected from the group consisting of polyethylene homopolymers and polyethylene copolymers containing up to about 5% α-olefin comonomer and (B) a poyethylene glycol stearate ester selected from the group consisting of

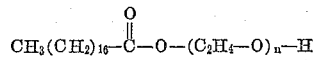

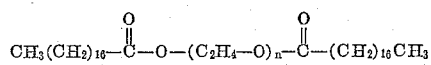

and mixtures thereof, with the average molecular weight of the unit —(C$_2$H$_4$—O)$_n$— being at least about 430, said stearate ester being present in an amount sufficient to substantially eliminate the tendency to accept an electrostatic charge.

The present invention also provides a process whereby the above composition is heated to a temperature above the melting point of the composition which may then be shaped and quenched to form a shaped article. The shaped article may take the form of granules, particles, films, large sheets, fibers, tubes and the like.

The present invention also provides the shaped structure resulting from the process, preferably in the form of a film or sheet, which shaped structure may be further processed with substantial freedom from electrostatic charging of the material.

The term "substantially non-static" is used to signify a composition which, when formed into a shaped structure, will not, for all practical purposes, accept any electrostatic charge. As is known in the art, it is difficult to state quantitatively the ability of a material to accept a positive or negative electrostatic charge and in the past it has been conventional to measure such charges by employing dust particles and the like to give some indication of the ability of the material to accept or resist charging. Such measurements are at best only qualitative and it should be noted that it is possible for a material to have a static charge of thousands of volts and still not attract, and probably even repel, dust particles. Even with today's quantitative type of measurement, there still remains the possibiltiy of machine and human error, as is hereinafter further discussed, and for this reason the term "substantially non-static" is used to signify that the materials employed in the present invention reduce the propensity of the high density polyethylene to accept an electrostatic charge to the extent of less than 2% of that which could be applied to the same high density polyethylene under the same conditions when such materials are not utilized in the composition. Thus, while no detectable charge is encountered in the examples of the compositions of the present invention, a small amount (i.e. less than 2%) may be present due to error which, for all practical purposes of fabrication, is completely negligible.

The expression "a polymer having a density of at least about 0.940 and selected from the group consisting of a polyethylene homopolymer and polyethylene copolymers containing up to about 5% α-olefin comonomer" is used to signify that the conventional high density polyethylene polymers may randomly contain in the polymer chain from 0 (a homopolymer) up to about 5% of a vinyl type comonomer. Such comonomers include, without limitation, 1-propene, 1-butene, 4-methyl-1-butene, 1-pentene, 1-hexene and the like. Other suitable vinyl type comonomers are described in United States Patent 2,825,721. When such vinyl type comonomers are employed in amounts of about 5% or less, they do not materially affect the non-static properties of the composition and may be used interchangeably with the homopolymers. Other polymers which are useful in the present invention are the aforementioned polyetheylene polymers, including copolymers, which have been hydrogenated so as to eliminate the terminal vinyl groups. For the purpose of this invention, these are considered to be polyethylenes although they are sometimes referred to as hydrogenated polyethylenes or polymethylenes. In a preferred embodiment of the present invention, a polyethylene homopolymer or a polyethylene copolymer containing up to about 3.0% of 1-butene is employed in the composition and the polymer has a density of about 0.945 to about 0.970 and a melt index of 0.0 to about 30 and more preferable from 0.0 to about 15.

The expression "in an amount sufficient to substantially eliminate the tendency to accept an electrostatic charge" is used in the same sense as the term "substantially non-static" and merely means that the stearate is employed in an amount which is sufficient to reduce the tendency of the polyethylene to accept an electrostatic charge to the extent of less than 2% of that which could be applied to the same high density polyethylene under the same conditions when such materials are not utilized in the composition. However, the stearate ester of the polyethylene glycol (often referred to as polyoxyethylene glycol) must have a sufficient number of the units $-(C_2H_4-O)_n-$ so that the molecular weight is at least about 430 for this portion of the molecule. In actuality, the stearates are formed so as to contain a mixture wherein the $n$ value varies somewhat and the molecular weight is expressed on an average basis. Thus, the amount of the stearate required will vary to a certain extent depending upon the molecular weight distribution of the units $-(C_2H_4-O)_n-$ as well as the molecular weight distribution, density and melt index of the high density polyethylene homopolymer or copolymer. It is to be noted that while the molecular weight of the unit $-(C_2H_4-O)-$ is approximately 44, the molecular weights will not necessarily be, and generally are not, an even multiple of 44, as might be expected, due to variance of the $n$ value. For this reason, if an absolutely pure single stearate were to be employed, rather than a mixture, the required molecular weight of 430 for the units $-(C_2H_4-O)_n-$ and minimum effective percentage required to give a non-static composition would vary slightly from those given in the examples.

In general, the minimum amount of stearate ester required will be above about 0.25% in order to give a "non-static" composition and amounts in excess of 10%, and generally only 3 to 6%, are to be avoided in order to substantially retain the original properties of the high density polyethylene. In a preferred embodiment of the present invention, a stearate ester having a $$-(C_2H_4-O)_n-$$

unit with an average molecular weight of from about 430 to about 5,000 is employed in amounts of from about 0.8 to about 6% by weight based on the weight of the high density polyethylene. In a still more preferred embodiment, the average molecular weight is from about 430 to about 1,500 so that the amount required is less than 3% with 2% being completely effective for most, if not all, the high density polyethylenes.

In the specification and claims all parts are expressed in parts by weight unless otherwise stated. The melt index is determined by the standard ASTM-D-1238-59T test and is reported in decigrams per minute. The density is given in grams per cubic centimeter at 23° C. as measured in a density gradient column such as that described in "Journal of Polymer Science," vol. 21, p. 144 (1956).

The following examples are given to illustrate the invention and are not intended to limit it in any manner.

The "high density" polyethylene polymers employed in the examples are prepared according to United States Patent 2,825,721 employing a pressure of about 450 p.s.i.g., a reaction time of about 2 hours, and chromium oxide supported on silica/alumina as the catalyst. In the examples a number of different polymers are employed and given the designation of A to G, inclusive. The polymerization temperature employed in the preparation of each of the polyethylenes and the characteristics of the polymers are as follows:

| Polyethylene | Preparation temperature, °F. | Density | Melt Index |
|---|---|---|---|
| A | 310 | 0.960 | 5.0 |
| B | 281 | 0.960 | 0.7 |
| C | 295 | 0.950 | 5.0 |
| D | 284 | 0.950 | 2.5 |
| E | 282 | 0.950 | 2.0 |
| F | 272 | 0.950 | 1.0 |
| G | 260 | 0.950 | 0.4 |

Polymers A and B are polyethylene homopolymers whereas polymers C through G, inclusive, are copolymers of polyethylene which contain about 1% of 1-butene copolymerized with the polyethylene.

In the table, commercial mono- and distearate products are employed. An analysis of the stearates show that such commercial products contain a mixture of the monostearate, distearate and free glycol due to the method of preparation. While the table gives the percentage of the commercial product employed, an analysis of the commercial products shows the following compositions: monostearate 400 is 49% monostearate, 36% distearate and 16% free glycol; monostearate 600 is 50% monostearate, 33% distearate and 17% free glycol; monostearate 1,000 is 50% monostearate, 31% distearate and 19% free glycol; monostearate 1,500 is 50% monostearate, 33% distearate and 17% free glycol; distearate 400 is 95% distearate and 5% monostearate and free glycol; and the distearate 600 is 95% distearate and 5% monostearate and free glycol. The monostearate 430 employed in the example is likewise a commercial product but is assumed to have the average molecular weight and composition assigned to it by the manufacturer. The monostearate 200 has approximately the same percentage composition as the monostearate 400.

The instrument employed to produce an electrostatic charge on the surface of the polyethylene polymer is a modified "Crockmeter." The "Crockmeter," before modification, is a rubbing machine employed by the textile industry for testing color fastness to rubbing. The machine is made in accordance with the "American Association of Textile Chemists and Colorists," Lowell Textile Industry, Lowell, Massachusetts. The only modification of the apparatus consists in the replacement of the original rubbing shoe by one suitable for use on flat plaques. The modified rubbing shoe is one whereby a felt pad is made to come in contact with the surface of the plaque. The felt pad measures 3½ x 1½ x ¼". By turning the crank the apparatus gives a constant reproducible stroke in length, pressure and rate. The strokes, or cycles, are automatically counted by a "Productimeter," Model 5-D-1, made by the Durant Manufacturing Co., of Milwaukee, Wisconsin.

The static charge given the test samples is measured by a static meter Model No. 250, static detecting head No. 2501, which is manufactured by the Keitheley Manufacturing Instruments, Inc., Cleveland, Ohio. The range of the instrument is from 0 to ±10,000 volts with the detecting head being held the recommended ⅜" from the test specimen.

EXAMPLES 1-25

Control runs 1-40

The high density polyethylene pellets employed in the examples are melted and masticated in a laboratory size Banbury mixer (40 ounce capacity) at 300° to 320° F. The additive is added in four approximately equal increments to the molten polyethylene polymer and masticated for a total period of about 15 minutes. The homogeneous mixture is then removed from the Banbury and "sheeted out" on a standard two-roll mill at 280° F. The resulting sheet is then cut in pieces and ground in a "Ball and Jewel" grinder to approximately 1/8" fragments. Test plaques, measuring 9 x 9 x 0.07", are compression molded at a temperature of 300° to 310° F. in a standard laboratory molding apparatus and then cooled. The plaques are trimmed and cut in half to give two test specimens measuring 8 x 4 x 0.07".

After molding, the plaques are kept for at least 24 hours in a constant temperature, constant humidity room before testing. Using the above described modified "Crockmeter," the test plaque is given 50 cycles of rubbing on one surface. The rubbing is done at the rate of one-cycle per second consisting of one forward and one backward stroke 4" in length.

The test plaque is immediately transferred to the aforementioned static meter in such a manner as to avoid dissipation of any electrical charge built up on the test specimen. The static charge measurement, as well as the rubbing of the specimen, is done in a constant temperature, constant humidity room according to ASTM standard conditions of 73° F. and 50% relative humidity. During the test, the static detecting head is kept at the recommended distance of 3/8" from the specimen. Under this condition, the voltage is read off the meter directly with each divison or mark on the meter indicating a value of 1,000 volts. Since each division on the meter is approximately 1/8" in length and represents 1,000 volts, the reading is accurate to a value of approximately ±100 volts.

Any sample showing no perceptible deflection in the meter is again tested in direct contact with the detecting head which increases the sensitivity of the meter so that each division is approximately equivalent to 200 volts instead of 1,000 volts. Thus, under these conditions the static charge can be measured with certainty within ±40 volts and most probably within a ± 10 to 20 volts. In the following table where a 0 value is given, no deflection whatsoever is noted under the extreme conditions.

The above mentioned polyethylene samples A to G, inclusive, are each processed in the aforementioned manner, employing no additive whatsoever, and a static charge of from 6,000 to 7,000 volts is noted in each instance.

Other runs are then carried out employing the polymers and percent concentration of the additive as indicated in the table. The voltage resulting from the procedure is also recorded in the table although no attempt is made to distinguish between positive or negative charges.

TABLE

| Example or Control Run | Polyethylene | Additive | Avg. M.W. of the unit $-(C_2H_4-O)_n-$ | Percent concentration of additive | Volts |
|---|---|---|---|---|---|
| Control Run 1. | B | Monostearate | 200 | 1.0 | 3,800 |
| Control Run 2. | B | do | 200 | 2.0 | 4,000 |
| Control Run 3. | B | do | 200 | 5.0 | 2,800 |
| Control Run 4. | F | do | 200 | 1.0 | 6,000 |
| Control Run 5. | F | do | 200 | 2.0 | 1,500 |
| Control Run 6. | F | do | 200 | 5.0 | 1,500 |
| Control Run 7. | D | Monostearate | 400 | 0.5 | 1,500 |
| Control Run 8. | B | do | 400 | 0.5 | 3,800 |
| Control Run 9. | C | do | 400 | 1.0 | 300 |
| Control Run 10. | A | do | 400 | 1.0 | 2,000 |
| Control Run 11. | A | do | 400 | 2.0 | 3,500 |
| Control Run 12. | C | do | 400 | 2.0 | 1,000 |
| Control Run 13. | C | Distearate | 400 | 1.0 | 2,000 |
| Control Run 14. | A | do | 400 | 1.0 | 2,000 |
| Control Run 15. | C | do | 400 | 1.5 | 1,800 |
| Control Run 16. | A | do | 400 | 1.5 | 2,000 |
| Control Run 17. | C | do | 400 | 2.0 | 3,000 |
| Control Run 18. | A | do | 400 | 2.0 | 5,000 |
| Control Run 19. | F | Monostearate | 430 | 0.4 | 1,500 |
| Control Run 20. | F | do | 430 | 0.6 | 2,500 |
| Control Run 21. | F | do | 430 | 0.8 | 2,800 |
| Control Run 22. | F | do | 430 | 1.0 | 1,000 |
| Example 1 | F | do | 430 | 2.0 | 0 |
| Control Run 23. | F | do | 600 | 0.5 | 1,500 |
| Control Run 24. | E | do | 600 | 0.5 | 1,400 |
| Control Run 25. | B | do | 600 | 0.5 | 3,600 |
| Example 2 | F | do | 600 | 0.8 | 0 |
| Example 3 | F | do | 600 | 1.0 | 0 |
| Example 4 | C | do | 600 | 1.0 | 0 |
| Example 5 | A | do | 600 | 1.0 | 0 |
| Example 6 | G | do | 600 | 1.2 | 0 |
| Example 7 | D | do | 600 | 1.2 | 0 |
| Example 8 | D | do | 600 | 1.5 | 0 |
| Example 9 | D | do | 600 | 1.5 | 0 |
| Example 10 | B | do | 600 | 1.5 | 0 |
| Example 11 | G | do | 600 | 1.5 | 0 |
| Example 12 | G | do | 600 | 2.0 | 0 |
| Example 13 | F | do | 600 | 2.0 | 0 |
| Example 14 | D | do | 600 | 2.0 | 0 |
| Example 15 | B | do | 600 | 2.0 | 0 |
| Control Run 26. | F | Distearate | 600 | 0.2 | 4,000 |
| Control Run 27. | B | do | 600 | 0.2 | 6,500 |
| Control Run 28. | E | do | 600 | 0.5 | 5,500 |
| Control Run 29. | B | do | 600 | 0.5 | 2,500 |
| Control Run 30. | F | do | 600 | 1.0 | 5,500 |
| Control Run 31. | C | do | 600 | 1.0 | 800 |
| Control Run 32. | B | do | 600 | 1.0 | 2,000 |
| Control Run 33. | A | do | 600 | 1.0 | 4,000 |
| Example 16 | D | do | 600 | 1.5 | 0 |
| Example 17 | C | do | 600 | 1.5 | 0 |
| Example 18 | A | do | 600 | 2.0 | 0 |
| Control Run 34. | F | Monostearate | 1,000 | 1.0 | 1,500 |
| Control Run 35. | A | do | 1,000 | 1.0 | 500 |
| Example 19 | A | do | 1,000 | 1.5 | 0 |
| Example 20 | C | do | 1,000 | 1.5 | 0 |
| Example 21 | F | do | 1,000 | 2.0 | 0 |
| Example 22 | A | do | 1,000 | 2.0 | 0 |
| Control Run 36. | F | do | 1,500 | 1.0 | 7,000 |
| Control Run 37. | C | do | 1,500 | 1.0 | 1,800 |
| Control Run 38. | A | do | 1,500 | 1.0 | 3,500 |
| Control Run 39. | A | do | 1,500 | 1.5 | 1,000 |
| Control Run 40. | C | do | 1,500 | 1.5 | 1,800 |
| Example 23 | F | do | 1,500 | 2.0 | 0 |
| Example 24 | A | do | 1,500 | 2.0 | 0 |
| Example 25 | C | do | 1,500 | 2.0 | 0 |

EXAMPLES 26-27

When the procedure of Example 5 is repeated employing the hydrogenated polyethylene polymer A, which now contains no terminal vinyl groups, a 0 voltage reading is again obtained. Similarly, when a polyethylene homopolymer having a density of about 0.941 and a melt index of about 16 is employed utilizing the procedure of Example 12, a 0 voltage reading is again obtained.

*Control runs 41–44*

In order to demonstrate that the stearate component of commercial mixtures is the active component, rather than any free glycol, two test plaques are prepared as previously described employing a polyethylene glycol per se having an average molecular weight of 600 as the additive and polymer F as the high density polyethylene. The polyethylene glycol 600 is employed in amounts of 1% and 2% which correspond to an effective amount of the monostearate ester of the polyethylene glycol 600. When employing 1% of the additive, the average charge on the two test plaques is found to be about 350 volts. When employing 2% of the additive the average charge is found to be about 300 volts.

The same procedure is repeated employing a polyethylene glycol having an average molecular weight of 1,500. The polyethylene glycol 1,500 is employed in amounts of 2% and 3% which correspond to an effective amount of the monostearate ester of the polyethylene glycol 1,500. When employing 2% of the additive the average charge on the two test plaques is found to be about 150 volts. When employing 3% of the additive the average charge is found to be about 2,750 volts.

As shown by the above control runs, the mono- and distearate esters with a —$(C_2H_4$—$O)_n$— unit having an average molecular weight of about 200 will not result in the "non-static" compositions of the present invention even when employed in amounts of up to 5%. The control runs also show that even when the molecular weight of the unit is increased to 400, it still will not give a "non-static" composition. The control runs and examples further demonstrate that when the average molecular weight of the unit is increased to a value of about 430, a certain critical minimum amount must be present in order to obtain "non-static" compositions. The control runs and examples further show that the same is true when the molecular weight of the unit is increased to 600, 1,000 or even more. However, when the average molecular weight of the unit is approximately 600, a lesser amount of the additive is required to give "non-static" compositions, and for this reason represents a preferred embodiment of the present invention.

As previously pointed out, when a high density polyethylene polymer is utilized without the additives of the present invention, a static charge of 6,000 to 7,000 volts can be applied to the material. As was also pointed out, when a 0 rating is obtained on the static meter under the above extreme conditions, this represents an error of certainly less than ±40 volts (80 volts) or less. Thus, if it is assumed that the error is 80 volts, the compositions of the present invention have reduced the static charge to less than 2% (i.e. about 1.33% or less) of that which could be applied under the same conditions to the same polymer when the additive is not employed. If we assume the more reasonable error of ±20 volts (40 volts) or less, the static charge is reduced to a maximum value which is less than 0.66% of that capable of being produced on the same polymer without the additive being present and the actual value is believed to be even less. Certainly then, the compositions of the present invention can be truly said to be "non-static" for they are substantially immune to electrical charging for all practical processing conditions or, in any event, result in charges which are so low as to be completely negligible.

While in the above examples clear polyethylene plaques are produced, it is obvious that other materials such as dyes, pigments, fibers and the like may be introduced without substantial alteration in the static properties of the resulting shaped structure.

Many equivalent modifications will be apparent to those skilled in the art from a reading of the foregoing without a departure from the inventive concept.

What is claimed is:

1. A substantially non-static composition comprising (A) a polymer having a density of at least about 0.940 and selected from the group consisting of polyethylene homopolymer and polyethylene copolymers containing up to about 5% of another α-olefin comonomer and (B) a mixture of polyethylene glycol stearate esters containing about 5% by weight of free glycol and an ester of the formula

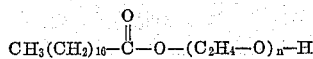

and about 95% by weight of an ester of the formula

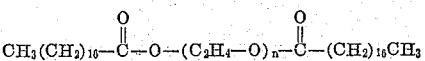

with the average molecular weight of the unit

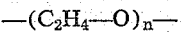

being about 600, the said mixture of stearate esters being present in amounts of from about 1.5 to about 2% by weight.

2. A process for producing a substantially non-static shaped structure which comprises heating to a temperature above the melting point a substantially non-static composition comprising (A) a polymer having a density of at least about 0.940 and selected from the group consisting of polyethylene homopolymers and polyethylene copolymers containing up to about 5% of another α-olefin comonomer and (B) a mixture of polyethylene glycol stearate esters containing about 5% of weight of free glycol and an ester of the formula

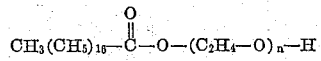

and about 95% by weight of an ester of the formula

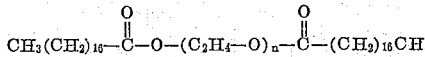

with the average molecular weight of the unit

being about 600, said mixture of stearate esters being present in amounts of from about 1.5 to about 2.0% by weight, shaping the molten composition and thereafter quenching the composition to form a shaped structure.

3. A substantially non-static shaped structure comprising the composition of claim 1.

References Cited by the Examiner
UNITED STATES PATENTS

| | | | |
|---|---|---|---|
| 2,525,691 | 10/50 | Lee et al. | 260—33.2 |
| 2,825,721 | 3/58 | Hogan et al. | 260—94.2 XR |
| 2,940,949 | 6/60 | Mullin | 260—31.4 |
| 3,009,830 | 11/61 | Levine | 260—410.6 XR |

FOREIGN PATENTS

| | | |
|---|---|---|
| 781,171 | 8/57 | Great Britain. |
| 810,385 | 3/59 | Great Britain. |

OTHER REFERENCES

Polyethylene, Raff and Allison, Interscience Publishers, Inc., New York, 1956.

MORRIS LIEBMAN, *Primary Examiner.*

LEON J. BERCOVITZ, *Examiner.*